US012385284B1

(12) United States Patent
Plemmons

(10) Patent No.: US 12,385,284 B1
(45) Date of Patent: Aug. 12, 2025

(54) DOOR CASING REINFORCING SYSTEM

(71) Applicant: Clay Plemmons, Candler, NC (US)

(72) Inventor: Clay Plemmons, Candler, NC (US)

( * ) Notice: Subject to any disclaimer, the term of this patent is extended or adjusted under 35 U.S.C. 154(b) by 112 days.

(21) Appl. No.: 18/200,790

(22) Filed: May 23, 2023

(51) Int. Cl.
*E05B 17/20* (2006.01)
*E05B 15/02* (2006.01)

(52) U.S. Cl.
CPC ...... *E05B 17/2084* (2013.01); *E05B 15/0205* (2013.01)

(58) Field of Classification Search
CPC ............... Y10T 292/79; Y10T 292/705; E05B 17/2084; E05B 15/0205
See application file for complete search history.

(56) References Cited

U.S. PATENT DOCUMENTS 1,373,678 A * 4/1921 Siemer ................ E05B 17/2088 292/346
1,428,367 A * 9/1922 Forlander ........... E05B 17/2088 292/DIG. 40
3,761,119 A * 9/1973 Bennett ............... E05B 17/2088 292/346
3,888,530 A 6/1975 Fabrici
4,171,836 A 10/1979 Aubin
4,390,199 A * 6/1983 Taylor ................. E05B 17/2003 292/346
4,690,445 A * 9/1987 Hartley ............... E05B 15/0205 292/87
4,717,185 A * 1/1988 Hartley ............... E05B 15/0205 292/346
4,802,701 A * 2/1989 Mazie ................. E05B 15/0205 292/346
4,854,621 A * 8/1989 Baldwin ............. E05B 15/0205 49/504
5,127,690 A * 7/1992 Kim .................... E05B 15/0245 292/DIG. 60
5,581,948 A * 12/1996 Simonsen ................. E06B 1/52 16/388
6,185,881 B1 2/2001 Olberding
6,857,672 B1 * 2/2005 Drew, II ............. E05B 15/0205 292/DIG. 55
D889,249 S 7/2020 Chen
11,280,110 B1 3/2022 Moeller
(Continued)

FOREIGN PATENT DOCUMENTS

GB 2197677 A * 5/1988 ......... E05B 17/2084
WO 2006118992 11/2006

*Primary Examiner* — Carlos Lugo
(74) *Attorney, Agent, or Firm* — Kyle A. Fletcher, Esq.

(57) ABSTRACT

The door casing reinforcing system includes a first reinforcing bracket and a second reinforcing bracket. The door casing reinforcing system may reinforce a door casing of a door to prevent an intrusive force from breaking the door casing in order to defeat a door lock that holds the door closed and/or bowing the door casing to allow the keeper to disengage. The first reinforcing bracket may couple to a wall stud in a wall that may be adjacent to the door. The second reinforcing bracket may couple to the door casing and to the front of the wall stud. The first reinforcing bracket may engage the second reinforcing bracket such that the intrusive force attempting to push the door into a room may be conveyed to the second reinforcing bracket and may be opposed by the wall stud via the first reinforcing bracket.

20 Claims, 7 Drawing Sheets

(56) References Cited

U.S. PATENT DOCUMENTS

| | | | |
|---|---|---|---|
| 11,542,734 B1 * | 1/2023 | Gunkler | E05C 17/02 |
| 2007/0029823 A1 | 2/2007 | Gatrell | |
| 2008/0202034 A1 | 8/2008 | Campbell | |
| 2015/0252589 A1 | 9/2015 | Johnson | |
| 2019/0271174 A1 | 9/2019 | Van Kampen | |

* cited by examiner

DOOR CASING REINFORCING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of mechanical security systems and door casings, more specifically, a door casing reinforcing system.

Summary of Invention

The door casing reinforcing system comprises a first reinforcing bracket and a second reinforcing bracket. The door casing reinforcing system may reinforce a door casing of a door to prevent an intrusive force from breaking the door casing in order to defeat a door lock that holds the door closed and/or bowing the door casing to allow the keeper to disengage. The first reinforcing bracket may couple to a wall stud in a wall that may be adjacent to the door. The second reinforcing bracket may couple to the door casing and to the front of the wall stud. The first reinforcing bracket may engage the second reinforcing bracket such that the intrusive force attempting to push the door into a room may be conveyed to the second reinforcing bracket and may be opposed by the wall stud via the first reinforcing bracket.

An object of the invention is to oppose an intrusive force that may be attempting to break through a locked door.

Another object of the invention is to provide a first reinforcing bracket that may couple to a wall stud adjacent to the door.

A further object of the invention is to provide a second reinforcing bracket that may couple to the door casing and to the front of the wall stud.

Yet another object of the invention is to interlock the first reinforcing bracket and the second reinforcing bracket using a plurality of tabs on the first reinforcing bracket and a plurality of tab retainers on the second reinforcing bracket such that the intrusive force is conveyed from the casing to the second reinforcing bracket and eventually to the first reinforcing bracket.

These together with additional objects, features and advantages of the door casing reinforcing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the door casing reinforcing system in detail, it is to be understood that the door casing reinforcing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the door casing reinforcing system.

It is therefore important that the claims be regarded as including such equivalent construction insofar as they do not depart from the spirit and scope of the door casing reinforcing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
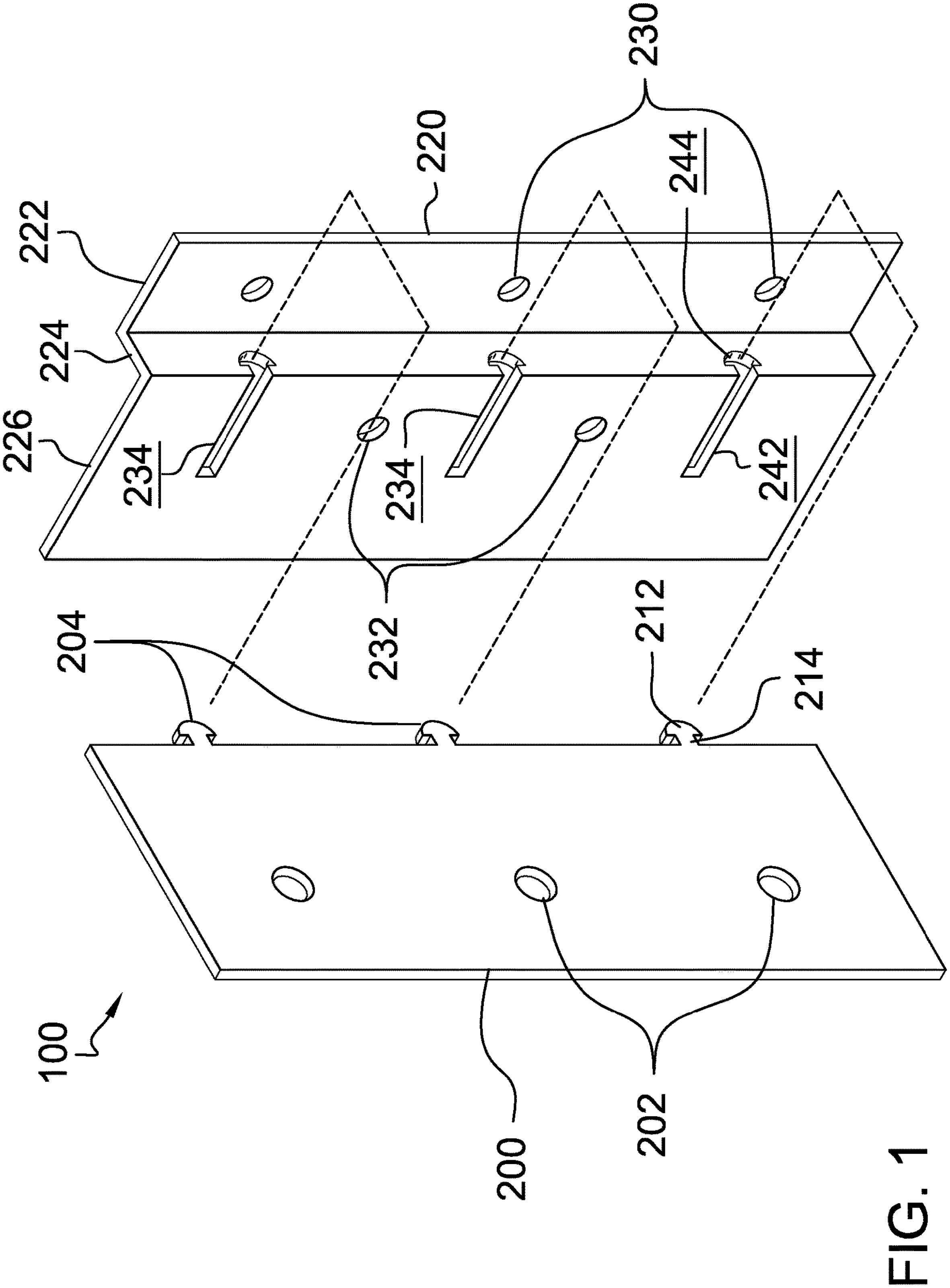
FIG. 1 is an exploded view of an embodiment of the disclosure.
Figure 2:
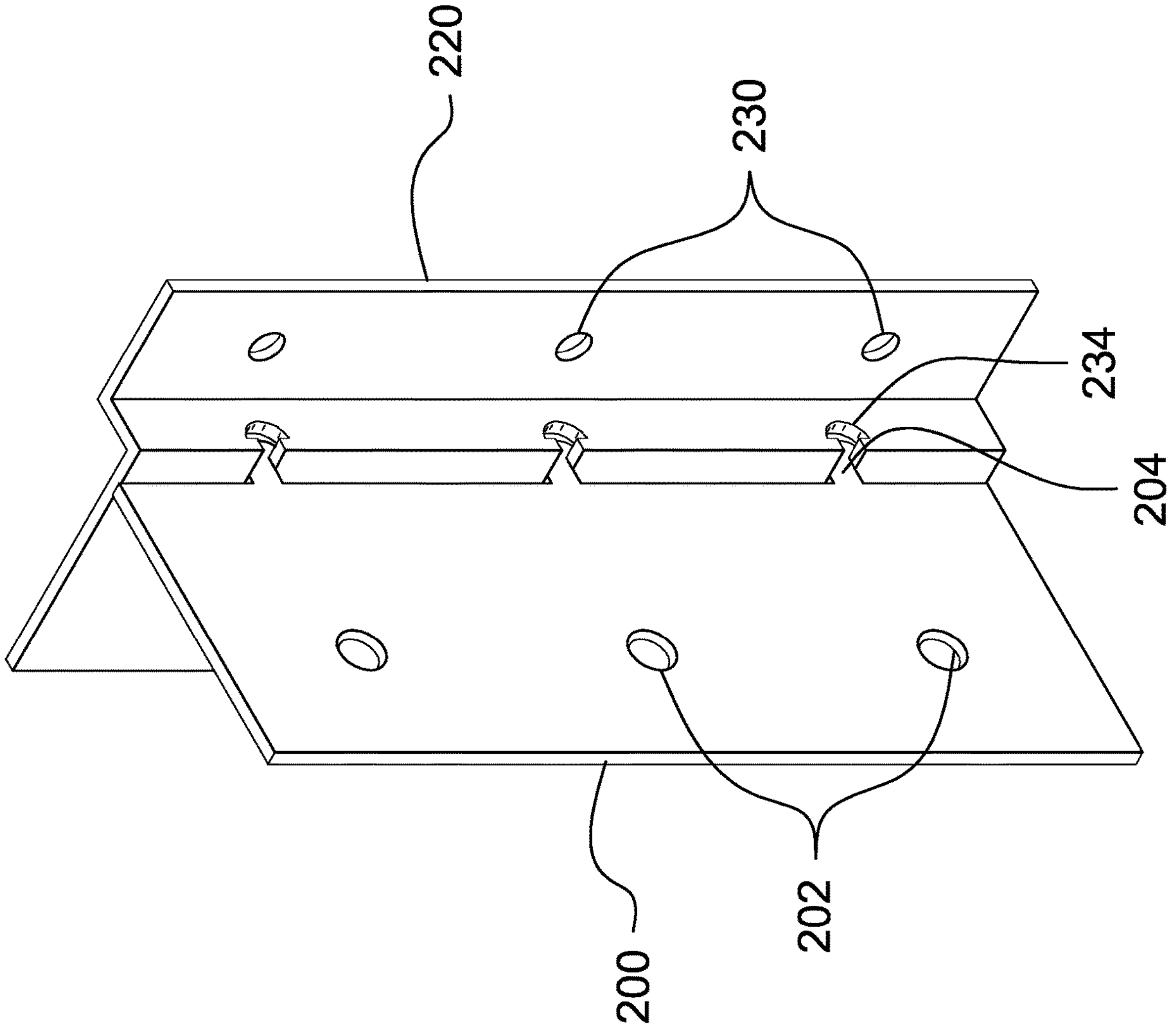
FIG. 2 is a detail view of an embodiment of the disclosure.
Figure 3A:
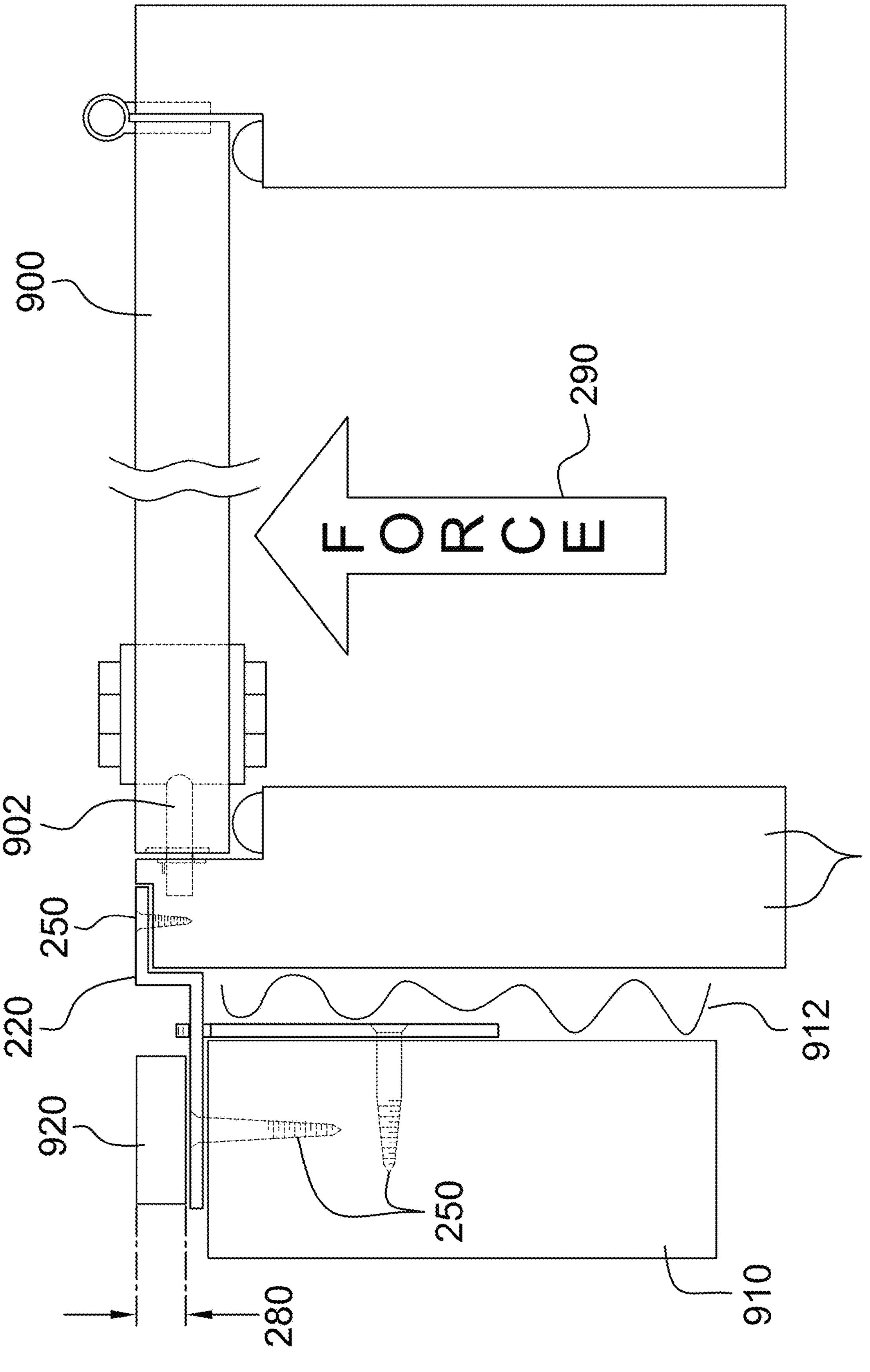
FIG. 3A is a top in-use view of an embodiment of the disclosure.
Figure 3B:
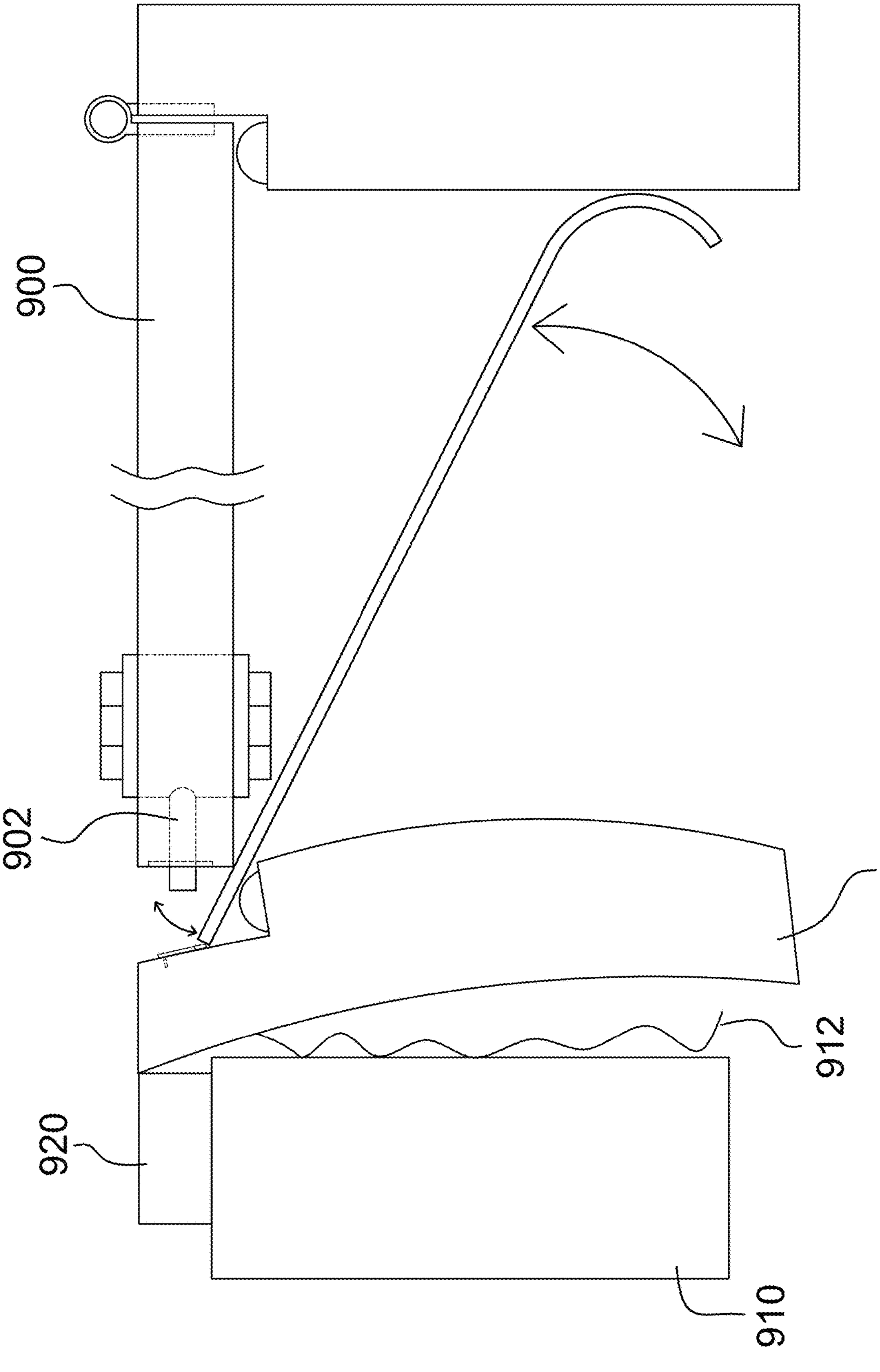
FIG. 3B is a view of a door bending due to a crow bar without the claimed device being present.
Figure 4A:
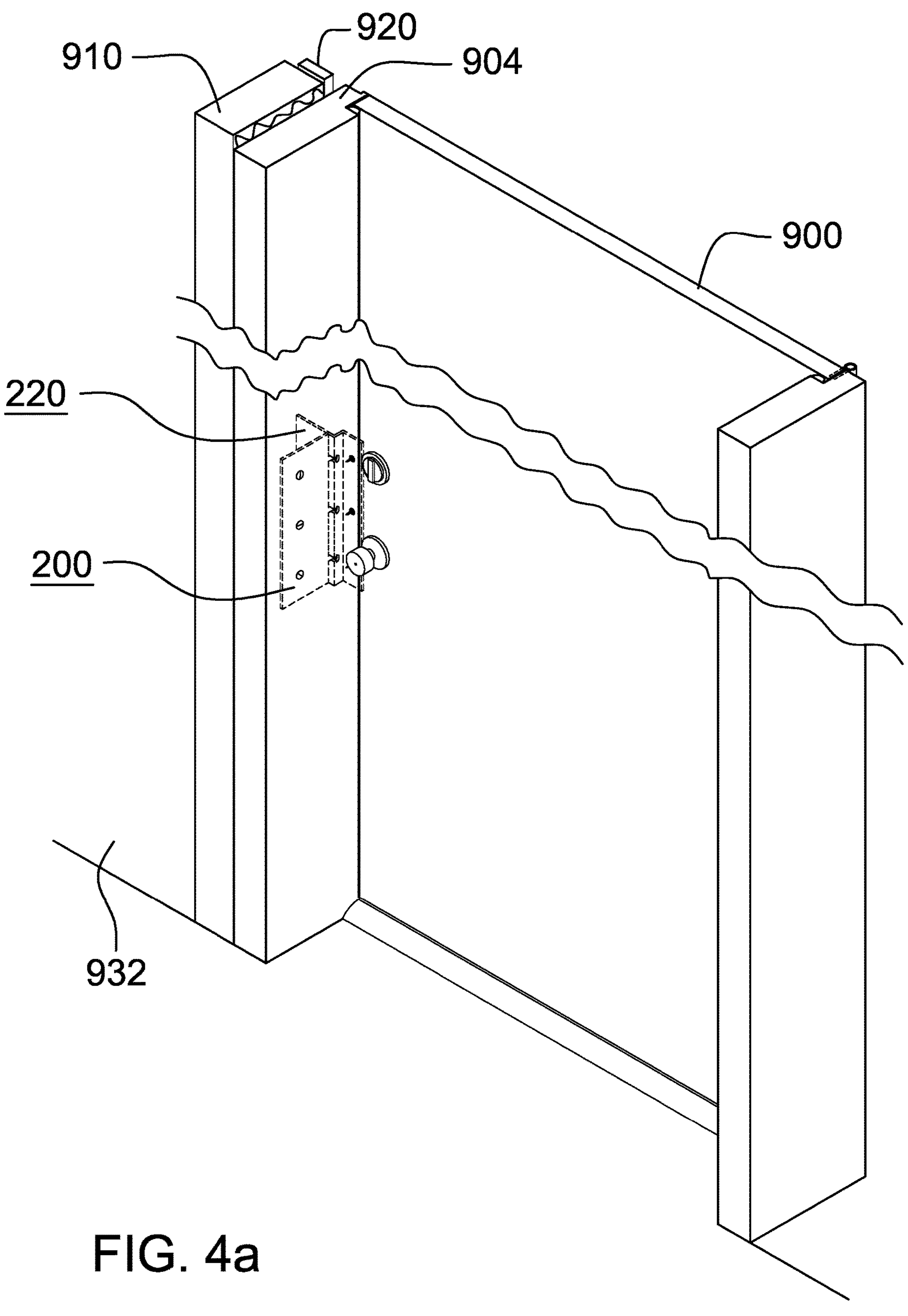
FIG. 4A is an isometric view of an embodiment of the disclosure.
Figure 4B:
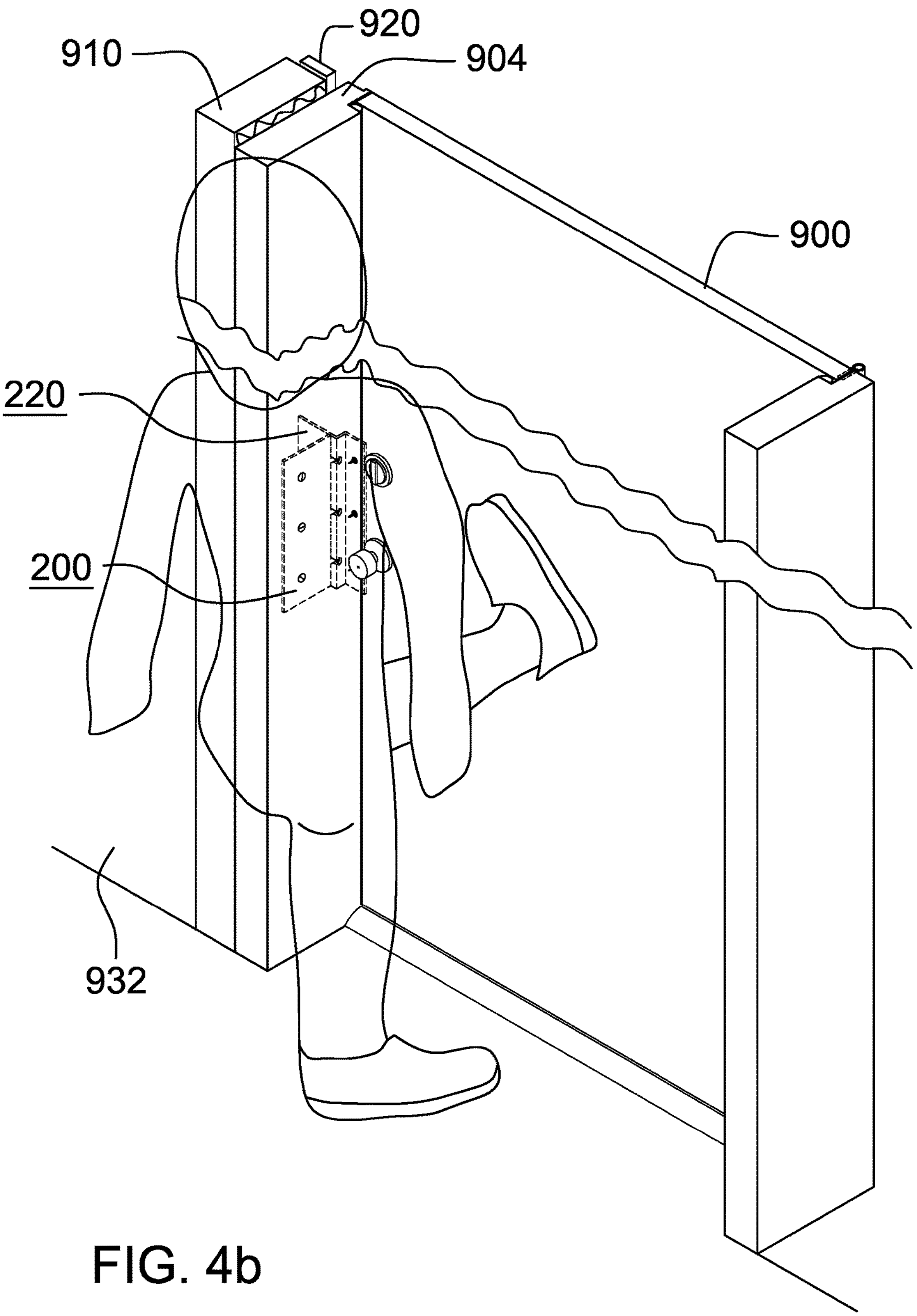
FIG. 4B is depicting a person attempting to kick open the door.
Figure 4C:
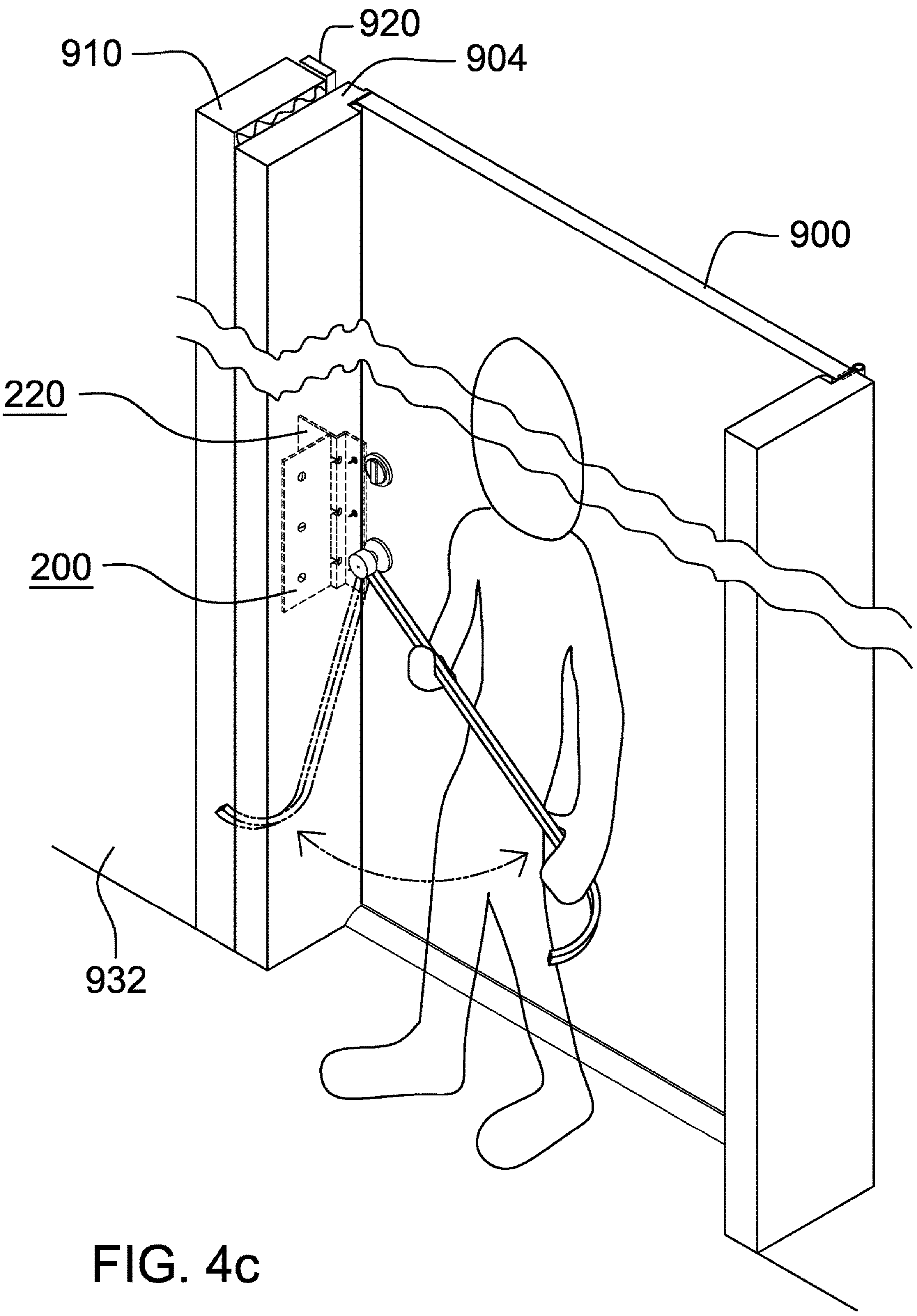
FIG. 4C is depicting a person using a crow bar attempting to pry open the door.

Detailed reference will now be made to a first potential embodiment of the disclosure, which is illustrated in FIGS. 1 through 4C.

The door casing reinforcing system 100 (hereinafter invention) comprises a first reinforcing bracket 200 and a second reinforcing bracket 220. The invention 100 may reinforce a door casing 904 of a door 900 to prevent an intrusive force 290 from breaking or bending the door casing 904 in order to defeat a door lock 902 that holds the door 900 closed. The first reinforcing bracket 200 may couple to a wall stud 910 in a wall 932 that may be adjacent to the door 900. The second reinforcing bracket 220 may couple to the door casing 904 and to the front of the wall stud 910. The first reinforcing bracket 200 may engage the second reinforcing bracket 220 such that the intrusive force 290 attempting to push the door 900 into a room may be conveyed to the second reinforcing bracket 220 and may be opposed by the wall stud 910 via the first reinforcing bracket 200.

The first reinforcing bracket 200 may be a rectangular metal plate. The first reinforcing bracket 200 may comprise a plurality of stud side apertures 202 and a plurality of retention tabs 204. The first reinforcing bracket 200 may be coupled to the wall stud 910 by screws 250 that pass through the plurality of stud side apertures 202 and into the wall stud 910. The first reinforcing bracket 200 may be coupled to a side of the wall stud 910 such that the plurality of retention tabs 204 project into the room. The plurality of retention tabs 204 may extend farther into the room than the front surface of the wall stud 910. The plurality of retention tabs 204 may be equally spaced on the first reinforcing bracket 200 and may align such that the plurality of retention tabs 204 are parallel to each other.

An individual retention tab selected from the plurality of retention tabs 204 may comprise a head 212 and a shaft 214. The head 212 may comprise a semi-circular footprint as viewed in a direction that is perpendicular to the plane of the first reinforcing bracket 200. The shaft 214 may be a rectangular armature that couples to the first reinforcing bracket 200 on one side and to the head 212 on the opposite side. The height of the shaft 214 may be smaller than the diameter of the head 212 such that the head 212 may extend above and below the shaft 214 by equal distances. As a non-limiting example, the first reinforcing bracket 200 and the plurality of retention tabs 204 may be stamped from a single piece of metal.

The second reinforcing bracket 220 may comprise a Z-shaped footprint as viewed from above. The Z-shaped footprint may define a first segment 222, a second segment 224, and a third segment 226. The first segment 222, the second segment 224, and the third segment 226 may each be rectangular armatures. The first segment 222 and the third segment 226 may be oriented such that the first segment 222 and the third segment 226 lie in parallel planes. The second segment 224 may join the first segment 222 to the third segment 226 and may be oriented to be orthogonal to both the first segment 222 and the third segment 226.

The first segment 222 may be positioned in front of the door casing 904 of the door 900. The first segment 222 may comprise a plurality of casing apertures 230. The first segment 222 may couple to the door casing 904 by passing screws 250 through the plurality of casing apertures 230 and into the door casing 904.

The third segment 226 may be positioned in front of the wall stud 910. The third segment 226 may comprise a plurality of stud front apertures 232. The third segment 226 may couple to the wall stud 910 by passing screws 250 through the plurality of stud front apertures 232 and into the wall stud 910.

The second segment 224 may be positioned along the front side of the door casing 904.

The second reinforcing bracket 220 may comprise a plurality of tab retainers 234. The plurality of retention tabs 204 on the first reinforcing bracket 200 may engage the plurality of tab retainers 234 on the second reinforcing bracket 220 such that the first reinforcing bracket 200 may prevent movement of the second reinforcing bracket 220 in the direction of the intrusive force 290. The plurality of tab retainers 234 may be equally spaced on the second reinforcing bracket 220 and may align such that the plurality of tab retainers 234 are parallel to each other. The spacing between the plurality of tab retainers 234 may match the spacing between the plurality of retention tabs 204. There may be a one-to-one correlation between the plurality of tab retainers 234 and the plurality of retention tabs 204 such that each of the plurality of retention tabs 204 may engage one of the plurality of tab retainers 234.

An individual tab retainer selected from the plurality of tab retainers 234 may comprise a retainer tab aperture 244 and a retainer slot 242. The retainer tab aperture 244 may be an aperture on the second segment 224 that aligns with the retainer slot 242. The retainer tab aperture 244 may have a shape that matches the shape of the head 212 of the individual retention tab. The retainer tab aperture 244 may be larger than the head 212 of the individual retention tab such that the head 212 of the individual retention tab may pass through the retainer tab aperture 244. The retainer slot 242 may be a rectangular aperture located on the third segment 226. The retainer slot 242 may extend to the second segment 224 such that the shaft 214 of the individual retention tab may slide into the retainer slot 242.

The second reinforcing bracket 220 may couple to the first reinforcing bracket 200 by aligning the plurality of retention tabs 204 of the first reinforcing bracket 200 with the plurality of tab retainers 234 of the second reinforcing bracket 220 and sliding the second reinforcing bracket 220 such that the plurality of retention tabs 204 engage the plurality of tab retainers 234. With the plurality of retention tabs 204 engaging the plurality of tab retainers 234, the invention 100 may reinforce the door casing 904 of the door 900 against the application of the intrusive force 290 to the door 900. As a non-limiting example, the intrusive force 290 may attempt to push the door casing 904 into the room and may, in fact, push the door casing 904 against the second reinforcing bracket 220. The second reinforcing bracket 220 may convey the intrusive force 290 to the first reinforcing bracket 200 by virtue of the second reinforcing bracket 220 pulling the plurality of retention tabs 204 of the first reinforcing bracket 200 at the plurality of tab retainers 234. The first reinforcing bracket 200 may be anchored to the wall stud 910 such that the invention 100 may mitigate the intrusive force 290.

The invention 100 may adjust for the distance between the door casing 904 and the wall stud 910 by virtue of the ability of the plurality of retention tabs 204 to slide within the plurality of tab retainers 234.

The shape of the second reinforcing bracket 220 may create an offset 280 such that the third segment 226 of the second reinforcing bracket 220 may be hidden behind a filler panel 920. As a non-limiting example, the filler panel 920 may be drywall. In some embodiments, the first segment 222 may be hidden behind door trim.

In use, the first reinforcing bracket 200 may be coupled to the side of a wall stud 910 with the plurality of retention tabs 204 extending into the room beyond the front of the wall stud 910. The second reinforcing bracket 220 may be coupled to the first reinforcing bracket 200 by aligning the plurality of tab retainers 234 on the second reinforcing bracket 220 with the plurality of retention tabs 204 on the first reinforcing bracket 200 and by sliding the second reinforcing bracket 220 laterally towards a door casing 904. The second reinforcing bracket 220 may then be coupled to the door casing 904 and to the front of the wall stud 910 using screws 250. Any open space between the wall stud 910 and the door casing 904 may be filled with insulation 912.

In some embodiments, the second reinforcing bracket 220 may be concealed by covering the second reinforcing bracket 220 with the filler panel 920, door trim, or a combination thereof.

In the event of an attempted intrusion through a door 900 having the door casing 904 reinforced by the invention 100, the intrusive force 290 applied to the door 900 may be conveyed to the door casing 904 via the door lock 902. The intrusive force 290 may then be conveyed to the second reinforcing bracket 220 by virtue of the coupling of the second reinforcing bracket 220 to the door casing 904. The intrusive force 290 attempting to push the second reinforcing bracket 220 into the room may be resisted by the first reinforcing bracket 200 by virtue of the coupling of the second reinforcing bracket 220 to the first reinforcing bracket 200 via the plurality of retention tabs 204 and the plurality of tab retainers 234 and by virtue of the coupling of the first reinforcing bracket 200 to the wall stud 910.

DEFINITIONS

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used herein, "intrusive force" may refer to a force used during an intrusion or other criminal act. As non-limiting examples, the intrusive force may be directed at a door or window with the intent of breaking through the door or window, may be directed towards a lock with the intent of defeating the lock, or may be directed towards a closed container with the intent of opening the container.

As used in this disclosure, the word "lateral" may refer to the sides of an object or movement towards a side. Lateral directions are generally perpendicular to longitudinal directions. "Laterally" may refer to movement in a lateral direction.

As used herein, "rectangle" and "rectangular" may refer to a closed figure comprising four straight lines joined by four right angles. The opposing sides of a rectangle have equal length. A square is considered to be a special type of rectangle where all four sides are the same length. An object may still be considered to have a generally rectangular shape even if corners of the object are rounded off as long as two sets of opposing, straight-line, perpendicular sides are apparent.

As used in this disclosure, a "slot" may be a prism-shaped negative space formed as a groove, cut, opening, or aperture in or through an object.

As used in this disclosure, a "tab" may be an extension of an object for the purpose of facilitating the manipulation of the object, identifying the object, or attaching the object to another object.

As used herein, "Z-shaped" may refer to a complex 2-dimensional bend in an element that comprises two changes of direction to form three distinct segments of the element. The first and third segment may be oriented to be parallel to each other. The second segment may join ends of the first and third segments and may be oriented in one of three manners. In a first orientation, sometime referred to as an orthogonal Z bend, the second segment may be orthogonal to both the first and third segments. In a second orientation, the second segment may form an oblique reverse angle with both the first and third segments (resembling the letter Z). In a third orientation, the second segment may form an oblique forward angle with both the first and third segments.

With respect to the above description, it is to be realized that the optimum dimensional relationship for the various components of the invention described above and in FIGS. 1 through 4C, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A doorjamb reinforcing system comprising:

a first reinforcing bracket and a second reinforcing bracket;

wherein the doorjamb reinforcing system reinforces a doorjamb of a door to prevent an intrusive force from breaking the doorjamb in order to defeat a door lock that holds the door closed or bowing the doorjamb to allow the keeper to disengage;

wherein the first reinforcing bracket couples to a wall stud in a wall that is adjacent to the door that is either of new construction or an existing door;

wherein the second reinforcing bracket couples to the door jamb and to the front of the wall stud;

wherein the first reinforcing bracket engages the second reinforcing bracket such that the intrusive force attempting to push the door into a room is conveyed to the second reinforcing bracket and is opposed by the wall stud via the first reinforcing bracket;

wherein the first reinforcing bracket comprises a plurality of stud side apertures and a plurality of retention tabs;

wherein the second reinforcing bracket comprises a plurality of tab retainers;

wherein the plurality of retention tabs on the first reinforcing bracket engage the plurality of tab retainers on the second reinforcing bracket such that the first reinforcing bracket prevents movement of the second reinforcing bracket in the direction of the intrusive force;

wherein the plurality of retention tabs on the first reinforcing bracket enable the first reinforcing bracket to slide with respect to the second plurality of tab retainers of the second reinforcing bracket in order for adjustment due to seasonal shifting;

wherein an individual retention tab selected from the plurality of retention tabs comprises a head and a shaft;

wherein the shaft is a rectangular armature that couples to the first reinforcing bracket on one side and to the head on the opposite side.

2. The doorjamb reinforcing system according to claim 1 wherein the first reinforcing bracket is a rectangular metal plate;

wherein the first reinforcing bracket is coupled to the wall stud by screws that pass through the plurality of stud side apertures and into the wall stud.

3. The doorjamb reinforcing system according to claim 2 wherein the plurality of retention tabs extend farther into the room than the front surface of the wall stud;

wherein the plurality of retention tabs are equally spaced on the first reinforcing bracket and align such that the plurality of retention tabs are parallel to each other.

4. The door jamb reinforcing system according to claim 3 wherein the head comprises a semi-circular footprint as viewed in a direction that is perpendicular to the plane of the first reinforcing bracket;

wherein the height of the shaft is smaller than the diameter of the head such that the head extends above and below the shaft by equal distances.

5. The doorjamb reinforcing system according to claim 4 wherein the first reinforcing bracket and the plurality of retention tabs are stamped from a single piece of metal.

6. The doorjamb reinforcing system according to claim 4 wherein the second reinforcing bracket comprises a Z-shaped footprint as viewed from above;

wherein the Z-shaped footprint defines a first segment, a second segment, and a third segment;

wherein the first segment, the second segment, and the third segment are each rectangular armatures.

7. The doorjamb reinforcing system according to claim 6 wherein the first segment and the third segment are oriented such that the first segment and the third segment lie in parallel planes.

8. The doorjamb reinforcing system according to claim 7 wherein the second segment joins the first segment to the third segment and is oriented to be orthogonal to both the first segment and the third segment.

9. The doorjamb reinforcing system according to claim 8 wherein the first segment is positioned in front of the doorjamb of the door;

wherein the first segment comprises a plurality of jamb apertures;

wherein the first segment couples to the door jamb by passing screws through the plurality of jamb apertures and into the doorjamb.

10. The doorjamb reinforcing system according to claim 9 wherein the third segment is positioned in front of the wall stud;

wherein the third segment comprises a plurality of stud front apertures;

wherein the third segment couples to the wall stud by passing screws through the plurality of stud front apertures and into the wall stud.

11. The doorjamb reinforcing system according to claim 10 wherein the plurality of tab retainers are equally spaced on the second reinforcing bracket and align such that the plurality of tab retainers are parallel to each other.

12. The doorjamb reinforcing system according to claim 11 wherein the spacing between the plurality of tab retainers matches the spacing between the plurality of retention tabs;

wherein there is a one-to-one correlation between the plurality of tab retainers and the plurality of retention tabs such that each of the plurality of retention tabs engages one of the plurality of tab retainers.

13. The doorjamb reinforcing system according to claim 12 wherein an individual tab retainer selected from the plurality of tab retainers comprises a retainer tab aperture and a retainer slot;

wherein the retainer tab aperture is an aperture on the second segment that aligns with the retainer slot;

wherein the retainer tab aperture has a shape that matches the shape of the head of the individual retention tab.

14. The doorjamb reinforcing system according to claim 13 wherein the retainer tab aperture is larger than the head of the individual retention tab such that the head of the individual retention tab passes through the retainer tab aperture.

15. The door jamb reinforcing system according to claim 14 wherein the retainer slot is a rectangular aperture located on the third segment;

wherein the retainer slot extends to the second segment such that the shaft of the individual retention tab slides into and along the retainer slot.

16. The doorjamb reinforcing system according to claim 15 wherein the second reinforcing bracket couples to the first reinforcing bracket by aligning the plurality of retention tabs of the first reinforcing bracket with the plurality of tab retainers of the second reinforcing bracket and sliding the second reinforcing bracket such that the plurality of retention tabs engage the plurality of tab retainers;

wherein with the plurality of retention tabs engaging the plurality of tab retainers, the door jamb reinforcing system reinforces the door jamb of the door against the application of the intrusive force to the door.

17. The doorjamb reinforcing system according to claim 16 wherein the intrusive force attempting to push the door jamb into the room pushes the door jamb against the second reinforcing bracket;

wherein the second reinforcing bracket conveys the intrusive force to the first reinforcing bracket by virtue of the second reinforcing bracket pulling the plurality of retention tabs of the first reinforcing bracket at the plurality of tab retainers;

wherein the first reinforcing bracket is anchored to the wall stud such that the door jamb reinforcing system mitigates the intrusive force.

18. The doorjamb reinforcing system according to claim 17 wherein the door jamb reinforcing system adjusts for the distance between the door jamb and the wall stud by virtue of the ability of the plurality of retention tabs to slide within the plurality of tab retainers.

19. The doorjamb reinforcing system according to claim 18 wherein the shape of the second reinforcing bracket creates an offset such that a filler panel hides the third segment of the second reinforcing bracket.

20. A door jamb reinforcing system comprising:

a first reinforcing bracket and a second reinforcing bracket;

wherein the door jamb reinforcing system reinforces a door jamb of a door to prevent an intrusive force from breaking the door jamb in order to defeat a door lock that holds the door closed;

wherein the door jamb reinforcing system reinforces the door jamb of the door to prevent the intrusive force from the door jamb to allow the keeper to disengage;

wherein the first reinforcing bracket couples to a wall stud in a wall that is adjacent to the door that is either of new construction or an existing door;

wherein the second reinforcing bracket couples to the door jamb and to the front of the wall stud;

wherein the first reinforcing bracket engages the second reinforcing bracket such that the intrusive force attempting to push the door into a room is conveyed to the second reinforcing bracket and is opposed by the wall stud via the first reinforcing bracket;

wherein the first reinforcing bracket comprises a plurality of stud side apertures and a plurality of retention tabs;

wherein the second reinforcing bracket comprises a plurality of tab retainers;

wherein the plurality of retention tabs on the first reinforcing bracket engage the plurality of tab retainers on the second reinforcing bracket such that the first reinforcing bracket prevents movement of the second reinforcing bracket in the direction of the intrusive force;

wherein the second reinforcing bracket couples to the first reinforcing bracket by aligning the plurality of retention tabs of the first reinforcing bracket with the plurality of tab retainers of the second reinforcing bracket and sliding the second reinforcing bracket such that the plurality of retention tabs engage the plurality of tab retainers;

wherein an individual retention tab selected from the plurality of retention tabs comprises a head and a shaft; and wherein the shaft is a rectangular armature that couples the first reinforcing bracket on one side and to the head on the opposite side.

* * * * *